(12) United States Patent
Muldowney

(10) Patent No.: US 10,218,116 B1
(45) Date of Patent: Feb. 26, 2019

(54) LOCKING VEHICLE ELECTRICAL CONNECTOR

(71) Applicant: Ford Global Technologies, LLC, Dearborn, MI (US)

(72) Inventor: Phillip Kerry Muldowney, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/723,960

(22) Filed: Oct. 3, 2017

(51) Int. Cl.
*H01R 13/62* (2006.01)
*H01R 13/629* (2006.01)
*H01R 13/641* (2006.01)
*B60R 16/023* (2006.01)

(52) U.S. Cl.
CPC ... *H01R 13/62927* (2013.01); *B60R 16/0231* (2013.01); *H01R 13/641* (2013.01)

(58) Field of Classification Search
CPC .. H01R 13/4534; H01R 13/641; H01R 13/62; H01R 13/62927; H01R 43/26; B60R 16/0231; B60L 11/1803
USPC ........................................................ 439/306
See application file for complete search history.

(56) References Cited

U.S. PATENT DOCUMENTS

| | | | |
|---|---|---|---|
| 5,609,494 A | 3/1997 | Yamaguchi et al. | |
| 6,030,235 A | 2/2000 | Ittah et al. | |
| 7,052,294 B1 | 5/2006 | Osada | |
| 7,959,470 B1 * | 6/2011 | Umetsu | B60L 11/1803 439/626 |
| 8,123,546 B2 * | 2/2012 | Suzuki | H01R 13/62 439/157 |
| 9,608,357 B1 * | 3/2017 | Sundarakrishnamachari | H01R 13/4534 |
| 2009/0075506 A1 | 3/2009 | Suzuki | |
| 2010/0288905 A1 * | 11/2010 | Shaffstall | B62J 11/00 248/540 |
| 2017/0187158 A1 * | 6/2017 | Crowe | H01R 43/26 |

* cited by examiner

*Primary Examiner* — Jean F Duverne
(74) *Attorney, Agent, or Firm* — James P. Muraff; Neal, Gerber & Eisenberg LLP

(57) ABSTRACT

An electrical connector for use in a vehicle is disclosed. An example electrical connector includes a first member having a face, configured to couple to a second member along a first axis. The electrical connector also includes a screw receiver coupled to the first member proximate the face. The electrical connector further includes a cam lock mechanism coupled to the first member. The cam lock mechanism includes an arm rotatable about a second axis perpendicular to the first axis. The cam lock mechanism also includes a screw coupled to the arm, configured to drive into the screw receiver.

20 Claims, 3 Drawing Sheets

LOCKING VEHICLE ELECTRICAL CONNECTOR

TECHNICAL FIELD

The present disclosure generally relates to electrical connections in a vehicle and, more specifically, a locking mechanism for determining and ensuring that an electrical connection is properly made.

BACKGROUND

Vehicles generally include electrical connectors for electrically connecting electronic components (e.g., vehicle seats, sensors, displays, speakers, electronic control units, etc.) together. Typically, an electrical connector includes one or more members or terminals that couple to respective one or more other members or terminals to complete the connection. Oftentimes, one of the members includes protrusions (e.g., male components) and the other includes indentations (e.g., female components) that receive the protrusions to couple the members together.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for vehicle electrical connectors and locking mechanisms. An example disclosed electrical connector includes a first member having a face, configured to couple to a second member along a first axis. The electrical connector also includes a screw receiver coupled to the first member proximate the face. The electrical connector further includes a cam lock mechanism coupled to the first member. The cam lock mechanism includes an arm rotatable about a second axis perpendicular to the first axis. And the cam lock mechanism also includes a screw coupled to the arm, configured to engage the screw receiver.

An example disclosed vehicle includes an electronic control unit, and an electrical device coupled to the electronic control unit via an electrical connector. The electrical connector includes a first member having a face, configured to couple to a second member along a first axis, a screw receiver coupled to the first member proximate the face, and a cam lock mechanism coupled to the first member. The cam lock mechanism includes an arm rotatable about a second axis perpendicular to the first axis, and a screw coupled to the arm, configured to engage the screw receiver.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
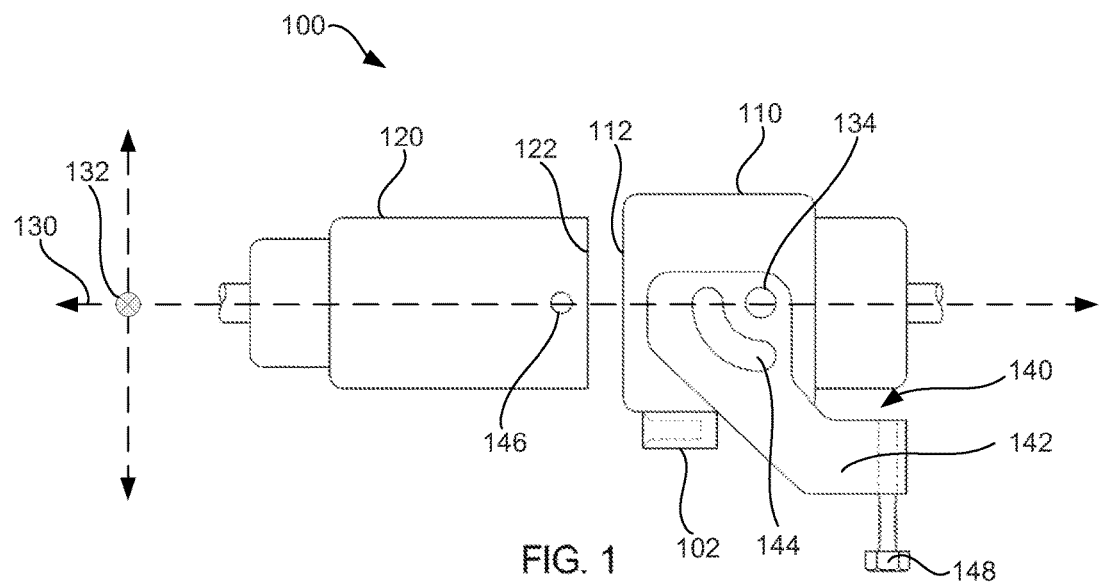
FIG. 1 illustrates a side perspective view of an example electrical connector with first and second members disconnected, according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, vehicles generally include electrical connectors for connecting electronic components (e.g., vehicle seats, sensors, displays, speakers, electronic control units, etc.) together. Some vehicle systems, particularly those related to safety applications, may require uninterrupted power or communication with a vehicle processor in order to function properly. These features can become disabled or may not function properly if they become disconnected from either a power source or a controlling device or system.

Some vehicles may include the ability to diagnose faulty connections, or determine when a connection has become uncoupled. However, these vehicles may fail to diagnose a faulty or uncoupled connection unless and until the terminals are completely decoupled. As such, they may fail to diagnose an issue in an electrical connection when it is partially loose or detached, not fully secured, or is close to becoming detached if further vibration occurs. For example, a particular connection in a vehicle may vibrate or shake due to movement of the vehicle, and may become disconnected over time due. But it may be difficult or impossible for some vehicles to detect that the connection is nearly disconnected, or is close to being vibrated loose.

With these issues in mind, example embodiments of the present disclosure may include a locking mechanism for an electrical connection that ensures the connection between two members is properly made, and prevents the connection from becoming disconnected or loosened over time due to vehicle vibrations. Example electrical connectors may include a cam lock mechanism having a rotatable arm configured to draw together the two sides of the connection (e.g., the male and female ends). The cam lock arm may include a screw configured to engage and drive into a screw receiver when the arm is in the locked position. If the arm is not in the locked position, the screw may not be able to drive into the screw receiver. As such, whether the screw can be driven into the screw receiver may provide an indication that the arm is fully rotated into the locked position, allowing a person or system making the connection to determine that the connection is properly made. The screw, when driven, may also prevent the arm from rotating out of the locked position, thereby ensuring that the connection does not become uncoupled or loosened over time due to vehicle vibrations.

FIG. 1 illustrates a side perspective view of an example electrical connection 100 between a first member 110 and a second member 120. In some examples, the members may be male and female members respectively, where one member includes one or more pins protruding from the face and the other includes one or more indentations or receptacles for the pins. In some examples, the members 110 and 120 may be genderless. As used herein, a "genderless" terminal or connectors refers to a terminal that includes one or more protrusions (e.g., male components) and one or more indentations (e.g., female components) such that the terminal is able to connect to an identical or substantially similar terminal. As used herein, a "genderless connector" and a "genderless electric connector" refer to an electrical connector that includes one or more genderless electric terminals.

Electrical connector 100 may be used to power one or more devices or systems of a vehicle, and/or to transmit information between devices and systems.

As shown in FIG. 1, first member 110 and second member 120 may have respective first and second faces 112 and 122. These faces may be configured to couple together to allow contact between the first and second members to complete the connection. Either of both of the faces 112 and 122 may include pins or indentations, configured to connect when the faces 112 and 122 are aligned parallel to each other.

In some examples, face 112 may be configured such that it is perpendicular to a first axis 130 along which the first member 110 and second member 120 couple together.

First member 110 may include a screw receiver 102 coupled at a location proximate the first face 112. In some cases, the screw receiver 102 and first member 110 may be manufactured as a single piece or part. Alternatively, the screw receiver 102 may be a separate component attached or coupled to first member 110. Screw receiver 102 (and similarly first member 110, second member 120, and/or one or more other components described herein) may be plastic, metal, a composite, or any other material.

Screw receiver 102 may include a threaded portion configured to receive a screw 148 when the screw 148 is aligned parallel to the first axis. In some examples, this may mean that the screw receiver 102 and/or a threaded portion thereof may be oriented parallel to first axis 130. As such, the screw receiver 102 and/or a threaded portion thereof may be aligned perpendicular to the face 112 of the first member 110.

In some examples, the screw receiver may be flush with the face 112 of the first member 110. In other cases, the screw receiver 102 may be set back from face 112, or may protrude beyond face 112. Screw receiver 102 may also be positioned in a center of face 112, or may be positioned toward one side or the other (i.e., at a position along a line parallel to the second axis 132).

Electrical connector 100 may also include a cam lock mechanism 140 coupled to the first member 110. The cam lock mechanism may be configured such that an arm rotates between an unlocked or open position, and a locked or closed position. The act of rotation between the unlocked position and the locked position may cause the second member 120 to be drawn into the first member 110, such that a connection can be completed.

The cam lock mechanism 140 may include an arm 142 rotatable about a second axis 132. Arm 140 is shown as being rotatable about point 134 in FIG. 1, which is a point along the second axis 132. The second axis is illustrated offset from the first member 110, however it should be noted that the second axis 132 may pass through point 134. Further, second axis 132 is shown in FIG. 1 as an axis extending horizontally into and out of the page. The second axis 132 may be perpendicular to the first axis 130 (i.e., forming a 90 degree angle).

The cam lock mechanism 140 may also include a hole 144, configured to accept a pin 146 of the second member 120. In some examples, the hole 144 may be an indentation, groove, carve-out, or other similar feature. And pin 146 may be a protrusion, notch, or other similar feature 146 configured to extend into hole 144.

Hole 144 may be positioned on the cam lock mechanism 140 such that rotation of the cam lock mechanism 140 about the second axis 132 causes rotation of hole 144 as well (also about the second axis 132). And when the pin 146 is positioned within the hole 144, the shape of the hole 144 and rotation of the cam lock mechanism 140 may cause the pin 146 to slide within the hole 144 and be drawn closer to the second axis 132. In other words, the rotation of cam lock mechanism 140 when pin 146 is positioned within hole 144 may cause the second member 120 to be drawn closer to first member 110 along the first axis 130, completing the electrical connection between the first and second members. This procedure can be seen progressively in FIGS. 1-3, which illustrate respectively unconnected first and second members 110 and 120, first and second members 110 and 120 where the pin 144 is positioned within the hole 146, and wherein the cam lock mechanism 140 has rotated to draw the members closer together and into contact.

The arm 142 of cam lock mechanism 140 is shown in profile in FIGS. 1-4. In some examples, arm 142 "U" shaped, "C" shaped, or any other shape that couples to first member 110 at two points along the second axis 132. FIG. 1 illustrates a first connection point 134 along the second axis. A second connection point may be on the opposite side of the first member 110.

In some examples, arm 142 may only couple to first member 110 at a single point along the second axis. In these examples, arm 142 may be "L" shaped, "J" shaped, or any other shape, and may only be connected to first member 110 at connection point 134.

Arm 142 may include a proximate end and a distal end. The proximate end may be coupled to the first member 110 along the second axis 132 at point 134 (and/or a second point if the arm is "U" shaped or "C" shaped). The distal end may then be configured to rotate or swing along an arc centered on the second axis 132.

Figure 2:
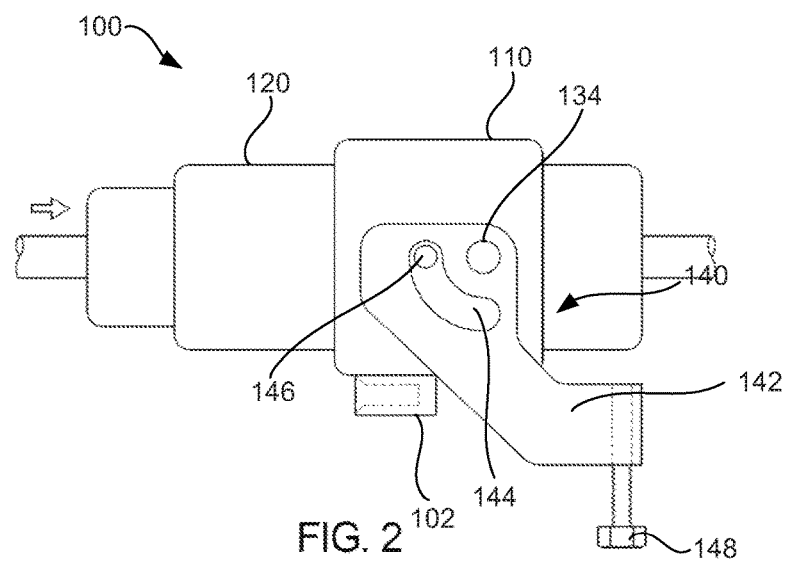
FIG. 2 illustrates a side perspective view of the example electrical connector of FIG. 1, with the first and second members connected.
Figure 3:
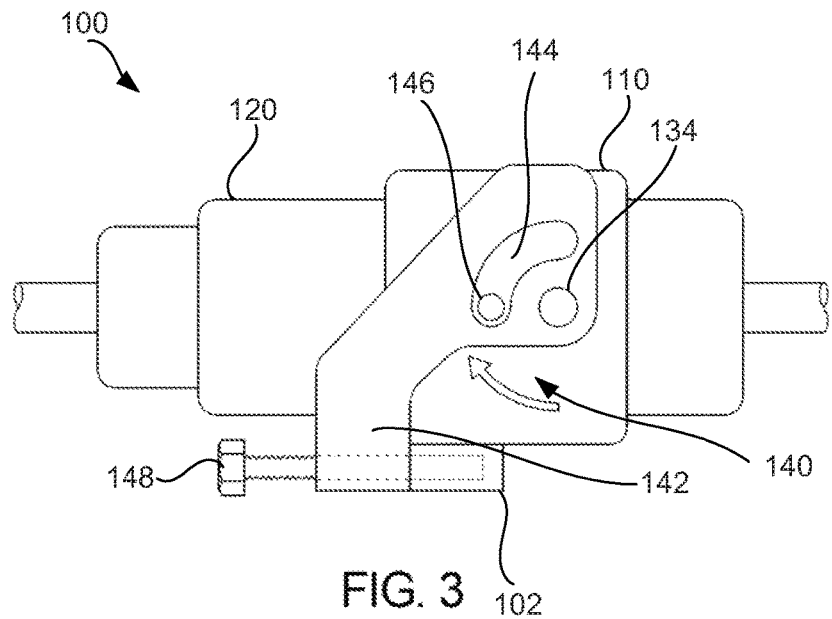
FIG. 3 illustrates a side perspective view of the example electrical connector of FIG. 1, including an arm in a locked position.
Figure 4:
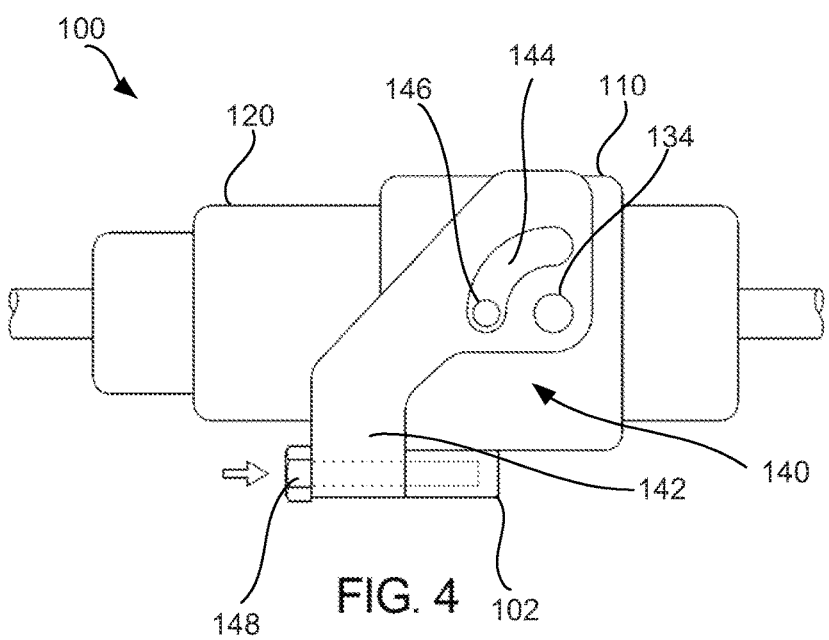
FIG. 4 illustrates a side perspective view of the example electrical connector of FIG. 1, including a screw driven into a screw receiver.

In some examples, the distal end of arm 142 may be configured to rotate between the open or unlocked position and the closed or locked position. FIGS. 1 and 2 illustrate the arm in the unlocked position, while FIGS. 3 and 4 illustrate the arm 142 in the locked position.

The open position shown in FIGS. 1 and 2 may allow pin 146 to enter hole 144, to enable cam lock mechanism 140 to operate. Then, rotation of the arm 142 and hole 144 may cause second member 120 and first member 110 to be drawn together, as described above.

The arm 142 may further include a screw 148 coupled thereto, configured to drive into the screw receiver 102. Alternatively, the screw 148 may be a separate component that is not included as a part of the arm 142. In some examples, screw 148 may be coupled to the distal end of arm 142. Further, screw 148 may be coupled to a central or middle portion of arm 142, in order to match a position of the screw receiver 102. Alternatively, screw 148 may be coupled to the arm 142 closer to one side or the other, offset, or otherwise not positioned in a central part of the distal end of arm 142.

In some examples, screw 148 may be coupled to arm 142 such that when the arm 142 is in the unlocked position, screw 148 is parallel to the face 112 of first member 110, perpendicular to the first axis 130, and perpendicular to the second axis 132.

In some examples, screw 148 may be coupled to arm 142 such that when arm 142 is in the locked position, screw 148 is perpendicular to the face 112 of the first member 110, parallel to the first axis 130, and perpendicular to the second axis 132.

The screw 148 is shown in the figures as an external drive hex-head fastener. But it should be noted that other types of screws may be used as well, including, Torx, Phillips, Robertson, slotted, flat head, button head, socket head, etc.

Further, in some examples, screw 148 may be threaded in part to match a threading of the screw receiver 102. In other examples, screw 148 may be a bolt, pin, or other cylindrical component configured to engage screw receiver 102. Where screw 102 is a pin or rod, it may be unthreaded. Further, the pin or rod may be coupled to a spring, configured to drive the pin or rod into the screw receiver 102 when the pin aligns with the screw receiver in the locked position.

In some examples, when the arm 142 is rotated about the second axis 132 to the locked position (shown in FIGS. 3 and 4), the screw 148 may align with the screw receiver 102. In the locked position, screw 148 may be configured to drive into screw receiver 102, as shown in FIG. 4.

The locked position of arm 142 may correspond to a completed electrical connection between the first member 110 and second member 120. When the screw 148 is driven into the screw receiver 102, the arm 142 may be prevented from rotating away from the locked position. As such, the electrical connection is secured, and will not become uncoupled unless the screw 148 is removed from the screw receiver 102. This provides added security and robustness of the connection, especially in a vehicle having vibrations and other movements which might ordinarily shake or loosen a connection.

Figure 5:
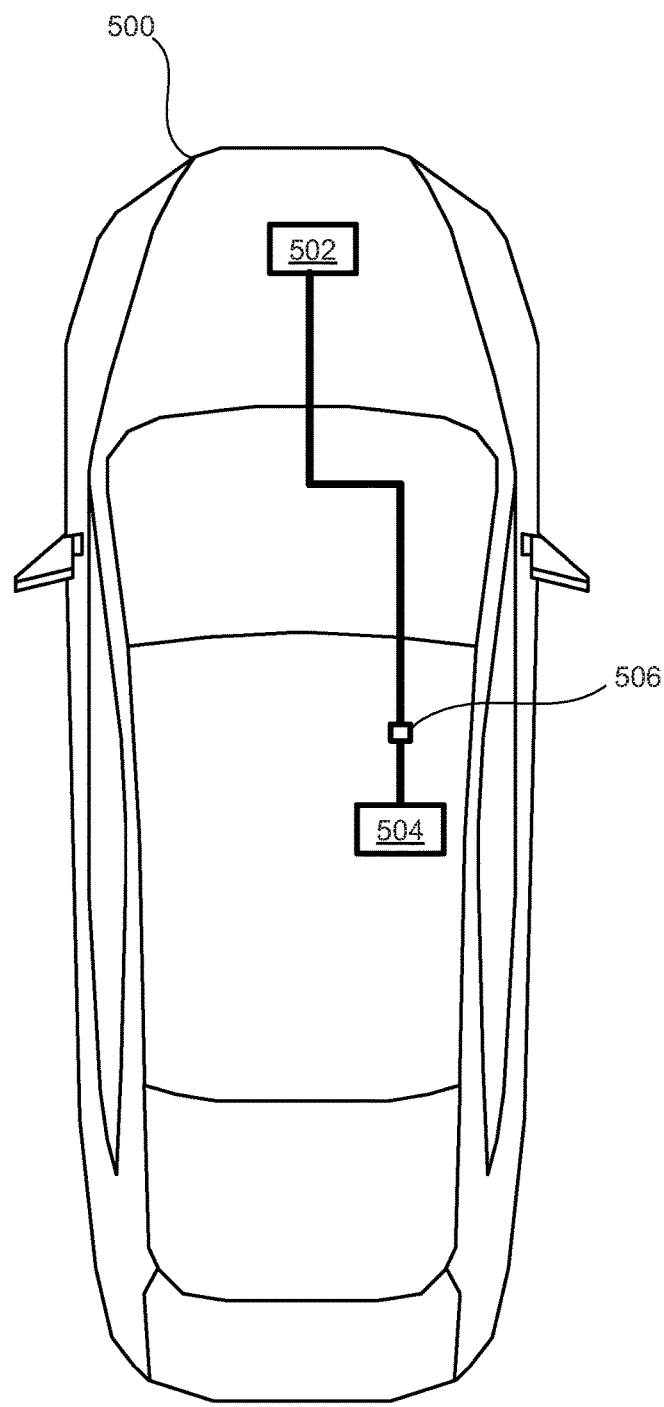
FIG. 5 illustrates a vehicle having an example electrical connector according to embodiments of the present disclosure.

FIG. 5 illustrates an example vehicle 500, which may include one or more of the electrical connectors described with respect to FIGS. 1-4. Vehicle 500 may include one or more electronic control units (ECUs) 502, one or more electronic devices 504, and one or more electrical connectors 506.

The ECU 502 may monitor and control one or more subsystems of the vehicle. For example, the ECU 502 may be a discrete set of electronics that include its own circuit(s) (e.g., integrated circuits, microprocessors, memory, storage, etc.), firmware, sensors, actuators, and/or mounting hardware. The ECU 502 may communicate and exchange information via a vehicle data bus. Additionally, the ECU 502 may communicate properties (e.g., status of the ECU 502, sensor readings, control state, error and diagnostic codes, etc.) to and/or receive requests from each other. For example, a vehicle may have seventy or more ECUs (e.g., including the ECU 502) that are positioned in various locations around the vehicle and are communicatively coupled by the vehicle data bus. For example, the ECU 502 may be a body control module, a brake control module, an engine control unit, a speed control unit, a telematic control unit, etc. Further, the vehicle 500 may be a standard gasoline powered vehicle, a hybrid vehicle, an electric vehicle, a fuel cell vehicle, and/or any other mobility implement type of vehicle. The vehicle includes parts related to mobility, such as a powertrain with an engine, a transmission, a suspension, a driveshaft, and/or wheels, etc. The vehicle may be non-autonomous, semi-autonomous (e.g., some routine motive functions are controlled by the vehicle), or autonomous (e.g., motive functions are controlled by the vehicle without direct driver input).

In the illustrated example, the vehicle 500 includes an electrical connector 506 configured to couple ECU 502 to electronic device 504. Electrical connector 506 may be similar or identical to the electrical connectors described with respect to FIGS. 1-4.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. An electrical connector comprising:
   a first member having a face, configured to couple to a second member along a first axis;
   a screw receiver coupled to the first member proximate the face; and
   a cam lock mechanism coupled to the first member, comprising:
      an arm rotatable about a second axis perpendicular to the first axis; and
      a screw coupled to the arm, configured to drive into the screw receiver.

2. The electrical connector of claim 1, wherein the first axis is perpendicular to the face of the first member.

3. The electrical connector of claim 1, wherein the screw receiver is positioned perpendicular to the face of the first member.

4. The electrical connector of claim 1, wherein the arm comprises:
   a proximate end, coupled to the first member at two points along the second axis; and
   a distal end, configured to rotate between an unlocked position and a locked position along an arc centered on the second axis.

5. The electrical connector of claim 4, wherein the screw is coupled to a middle of the distal end of the arm.

6. The electrical connector of claim 5, wherein the screw is perpendicular to both the first axis and the second axis when the arm is in the unlocked position.

7. The electrical connector of claim 5, wherein the screw is parallel to the first axis when the arm is in the locked position.

8. The electrical connector of claim 4, wherein the screw configured to drive into the screw receiver when the arm is in the locked position.

9. The electrical connector of claim 8, wherein the arm is prevented from rotating away from the locked position when the screw is driven into the screw receiver.

10. A vehicle comprising:
an electronic control unit; and
an electrical device coupled to the electronic control unit via an electrical connector,
wherein the electrical connector comprises:
a first member having a face, configured to couple to a second member along a first axis;
a screw receiver coupled to the first member proximate the face; and
a cam lock mechanism coupled to the first member, comprising:
an arm rotatable about a second axis perpendicular to the first axis; and
a screw coupled to the arm, configured to engage the screw receiver.

11. The vehicle of claim 10, wherein the first axis is perpendicular to the face of the first member.

12. The vehicle of claim 10, wherein the screw receiver is positioned perpendicular to the face of the first member.

13. The vehicle of claim 10, wherein the arm comprises:
a proximate end, coupled to the first member at two points along the second axis; and
a distal end, configured to rotate between an unlocked position and a locked position along an arc centered on the second axis.

14. The vehicle of claim 13, wherein the screw is coupled to a middle of the distal end of the arm.

15. The vehicle claim 14, wherein the screw is perpendicular to both the first axis and the second axis when the arm is in the unlocked position.

16. The vehicle of claim 14, wherein the screw is parallel to the first axis when the arm is in the locked position.

17. The vehicle of claim 13, wherein the screw configured to drive into the screw receiver when the arm is in the locked position.

18. The electrical connector of claim 4, wherein the distal end comprises an inner surface defining a hole, wherein the screw is configured to drive into the hole.

19. The electrical connector of claim 18, wherein, when the distal end is in the unlocked position, the screw receiver and the hole are aligned along a direction parallel to the first axis.

20. An electrical connector comprising:
a first member;
a screw receiver coupled to the first member; and
a cam lock mechanism configured to transition from a first position to a second position to couple the first member with a second member, the cam lock mechanism comprising a screw,
wherein the screw is insertable into the screw receiver when the cam lock mechanism is in the second position.

* * * * *